US006501873B1

United States Patent
Moon et al.

(10) Patent No.: US 6,501,873 B1
(45) Date of Patent: Dec. 31, 2002

(54) APPARATUS FOR GENERATING L-BAND LIGHT SOURCE USING OPTICAL FIBER, AND OPTICAL AMPLIFIER

(75) Inventors: Hyung Myung Moon, Incheon (KR); Kyu Haeng Lee, Seoul (KR)

(73) Assignee: Mercury Corporation, Incheon (KR)

( * ) Notice: Subject to any disclaimer, the term of this patent is extended or adjusted under 35 U.S.C. 154(b) by 0 days.

(21) Appl. No.: 09/490,469

(22) Filed: Jan. 24, 2000

(30) Foreign Application Priority Data

Jan. 23, 1999 (KR) .............................................. 99-2098
Jan. 23, 1999 (KR) .............................................. 99-2105

(51) Int. Cl.[7] ................................................. G02B 6/26
(52) U.S. Cl. ........................... 385/27; 359/345; 359/341
(58) Field of Search .............................. 385/15, 27, 31; 359/333, 341–345, 347, 349

(56) References Cited

U.S. PATENT DOCUMENTS 5,644,123 A * 7/1997 Hait ..................... 250/214 LS
6,222,670 B1 * 4/2001 Ryu et al. .................... 359/337
6,307,669 B1 * 10/2001 Flood et al. ............. 359/341.3
6,317,254 B1 * 11/2001 Park et al. ............. 359/341.33

* cited by examiner

Primary Examiner—Akm E. Ullah
Assistant Examiner—Michelle R. Connelly-Cushwa
(74) Attorney, Agent, or Firm—Lilling & Lilling P.C.

(57) ABSTRACT

The present invention provides an apparatus for generating L-band light source and an optical signal amplifier, specifically, relates to an apparatus for generating L-band light source by increasing amplification gain against an L-band light to execute a stable resonating operation, and to an optical amplifier which amplifies L-band light signal efficiently. That is, it is possible to use the output light of the first optical fiber amplifier 10 as a pumping light of the second optical fiber amplifier 20 by connecting the first optical fiber amplifier 10 for supplying a maximum amplification gain against an input light having a wavelength of 1530 nm to 1560 nm with the second optical fiber amplifier 20 for supplying a maximum amplification gain against an input light having a wavelength of 1570 nm to 1610 nm in series, thus securing a satisfied amplification gain against a L-band light and to generate a desirable light source.

8 Claims, 9 Drawing Sheets

<Prior Art>

APPARATUS FOR GENERATING L-BAND LIGHT SOURCE USING OPTICAL FIBER, AND OPTICAL AMPLIFIER

BACKGROUND OF THE INVENTION

1. Field of the Invention

The present invention relates to an apparatus for generating L-band light source and an optical signal amplifier, specifically, relates to an apparatus for generating L-band light source by increasing amplification gain against an L-band light to execute a stable resonating operation, and to an optical amplifier which amplifies L-band light signal efficiently.

2. Discussion of Related Art

In general, an optical transmission apparatus uses a wavelength band of approximately 1530 nm to 1560 nm, such as commercial band C-band or middle band M-band, which is caused by characteristics of optical amplifier for amplifying optical signal transmitted mostly through optical line. At present, the optical amplifier is configured in a manner that a pumping light of 980 nm or 1480 nm is supplied with an erbium-doped-fiber EDF doped with a rare earth ion such as erbium. As shown in FIG. 1, a graph showing amplification gain characteristics of the optical fiber amplifier, the optical fiber amplifier provides an efficient amplification gain in a wavelength band of approximately 1530 nm to 1560 nm. Meanwhile, the optical transmission system using C-band needs an apparatus for generating a light source having corresponding wavelength band. In general, the light source generating apparatus uses a semi-conductor laser device or the erbium-doped-fiber EDF. The light source generating apparatus using ELF has a ring-type structure generally which returns amplified signal output from the EDF back to the EDF through a specific tunable filter.

FIG. 2 is a block diagram of a conventional light source generating apparatus having the ring-type structure. Reference numeral 1 denotes a pumping laser diode which outputs pumping light of 980 nm or 1480 nm, for example. Pumping light output from the pumping laser diode 1 is input to an erbium-doped-fiber EDF 3 through a wavelength division multiplexer WDM 2. Then, optical signal output from the EDF 3 is input to a tunable filter 5 through an isolator 4 which passes a specific wavelength light. The specific wavelength light output from the tunable filter 5 is returned back to the EDF 3 by way of a tap coupler 6, an isolator 7 and the wavelength division multiplexer WDM 2. The tap coupler 6 divides optical signal output from the tunable filter 5 in a predetermined ratio, for example 70:30, and outputs the 70% light as an output light and the 30% light to the isolator 7 as an input. In the above configuration, it is possible to form a resonating structure for a specific wavelength light by returning the amplified light output from the EDF 3 back to the EDF 3 through the tunable filter 5, and to obtain the specific wavelength light by outputting the amplified light through the tap coupler 6.

Meanwhile, as optical communication techniques have been developed rapidly, a wavelength division multiplexing WDM transmission technique for transmitting optical signal having plural wavelengths through one optical line simultaneously has been widely used so as to increase transmission efficiency of the optical line. Accordingly, the wavelength division multiplexing WDM system requires methods for transmitting a large number of wavelengths, i.e., channels through a single optical line at a time. However, as described above, it is very difficult to secure a large number of channels more than a predetermined number since the available wavelength band in the present optical transmission system is confined within 1530 nm to 1560 nm due to the amplification characteristics of the optical fiber amplifier. In consideration of the above obstacle, an advanced methods has been studied for transmitting optical signal using a L-band, i.e., a wavelength of 1570 nm to 1610 nm, no the C-band. By this means, it is considered to increase the amplification efficiency of L-band light by altering the length of the EDF 3. That is, the L-band gain of the EDF 3 is increased according as the EDF 3 is lengthened. For example, if the length of the EDF 3 is 21 m, the gain is increased against the wavelength of 1530 nm to 1560 nm, if the length is 100 m, the gain is increased against the wavelength of 1570 nm to 1610 nm. However, since it is also impossible to obtain more than a maximum −50 dB output power by supplying a normal pumping light even though the EDF 3 is lengthened to increase the amplification gain of L-band light, it is readily appreciated that the above method is inadequate to amplify the L-band light. Besides, in the light source generating apparatus having the ring-type structure as shown in FIG. 2, a light having a wavelength more than 1600 nm is not resonated and the gain is decreased since the amplification gain of L-band is very weak as shown in FIG. 1. Consequently, it is impossible to generating L-band light by using the EDF 3.

SUMMARY OF THE INVENTION

Accordingly, the present invention is directed to an apparatus for generating L-band light source using optical fiber, and an optical amplifier that substantially obviates one or more of the problems due to limitations and disadvantages of the related art.

An object of the present invention is to provide an apparatus for generating L-band light source using optical fiber amplification.

Another object of the present invention is to provide an optical amplifier which can amplify L-band light efficiently using optical fiber amplifiers.

Another object of the present invention is to provide an apparatus for generating L-band light source and an optical amplifier which has a single structure so as to be alternatively used as the apparatus for generating L-band light source or the optical amplifier.

To accomplish an object in accordance with a first embodiment of the present invention, there is provided an apparatus for generating L-band light source using optical fiber comprising, in accordance with a first embodiment of the invention comprising: a first optical fiber amplifier for supplying a maximum amplification gain against an input light having a wavelength of 1530 nm to 1560 nm; a second optical fiber amplifier, connected with the first optical fiber amplifier, for providing a maximum amplification gain against an input light having a wavelength of 1570 nm to 1610 nm; and a tunable filter for passing an input light having a specific wavelength from the light output from the second optical fiber amplifier, the output light of the tunable filter is input to the first optical fiber amplifier, a tap coupler is established on an optical line through which the output light of the second optical fiber amplifier is forwarded to the first optical fiber amplifier.

To accomplish an object in accordance with a second embodiment of the present invention, there is provided an optical amplifier comprising: a first optical fiber amplifier, connected with an optical line in series, for supplying a maximum amplification gain against an input light having a wavelength of 1530 nm to 1560 nm; and a second optical fiber amplifier, connected with the first optical amplifier, for providing a maximum amplification gain again an input light having a wavelength of 1570 nm to 1610 nm.

To accomplish an object in accordance with a third embodiment of the present invention, there is provided an apparatus for generating L-band light source and an optical amplifier comprising: a first optical fiber amplifier for supplying a maximum amplification gain against an input light having a wavelength of 1530 nm to 1560 nm; a second optical fiber amplifier, connected with the first optical fiber amplifier, for providing a maximum amplification gain against an optical signal having a wavelength of 1570 nm to 1610 nm; a tunable filter for passing an input light having a specific wavelength from the light output from the second optical amplifier; a switching means for inputting the output light of the tunable filter or a specific input light selectively to the first optical fiber amplifier; and a tap coupler for receiving the output light of the second optical fiber amplifier and outputting a predetermined amount of light as an output light.

According to the above configuration of the present invention, the first optical fiber amplifier supplying a maximum amplification gain against an input light of a wavelength of 1530 nm to 1560 nm and the second optical fiber amplifier providing a maximum amplification gain against an optical signal of a wavelength of 1570 nm to 1610 nm are connected with each other in series so as to use the output light of the first optical fiber amplifier as a pumping light of the second optical fiber amplifier. Accordingly, it is possible to supply a satisfied amplification gain and a stable resonating operation against a L-band signal light, thus generating a good light source.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
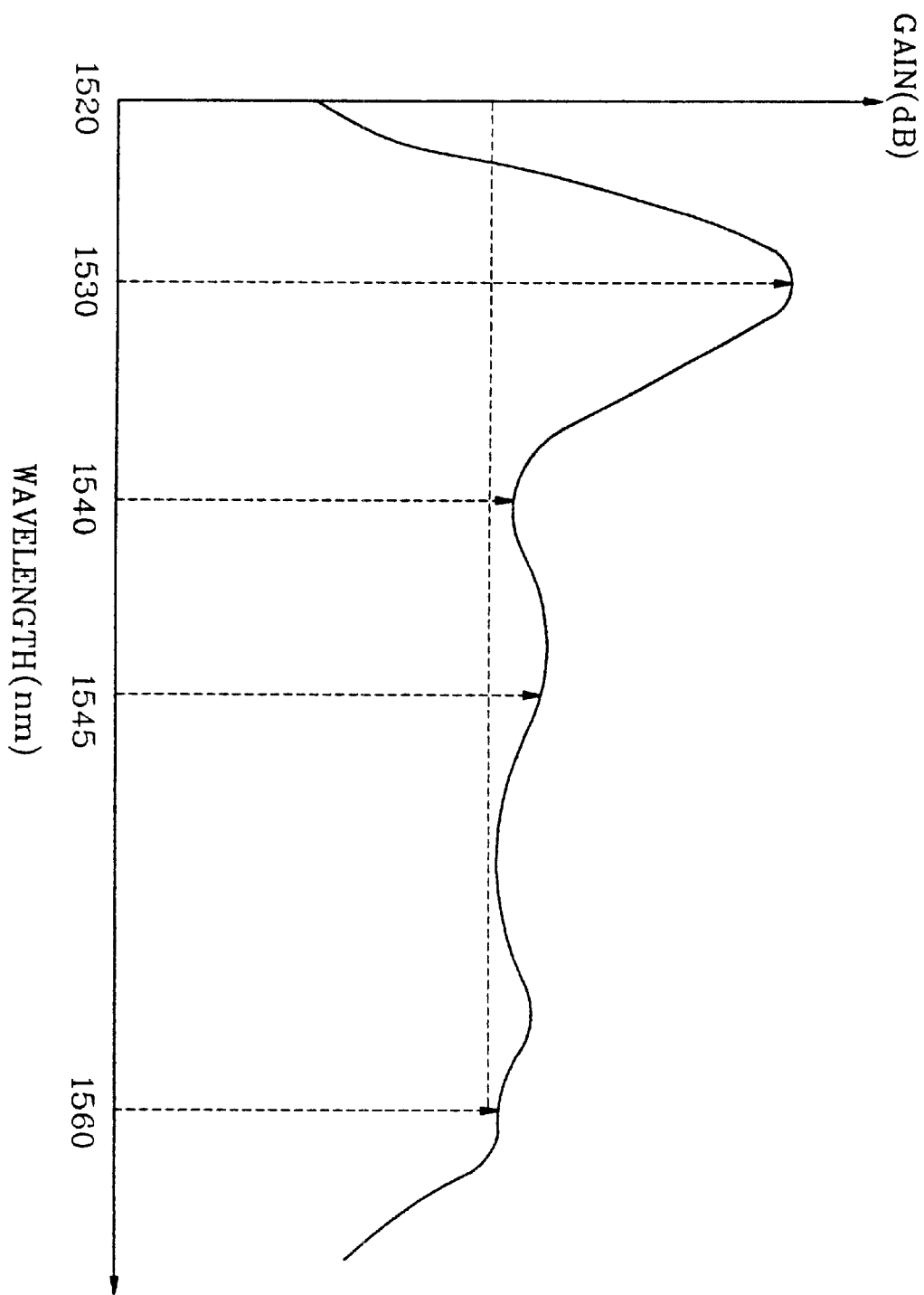
FIG. 1 is a graph showing amplification gain characteristics of a general erbium-doped-fiber EDF.
Figure 2:
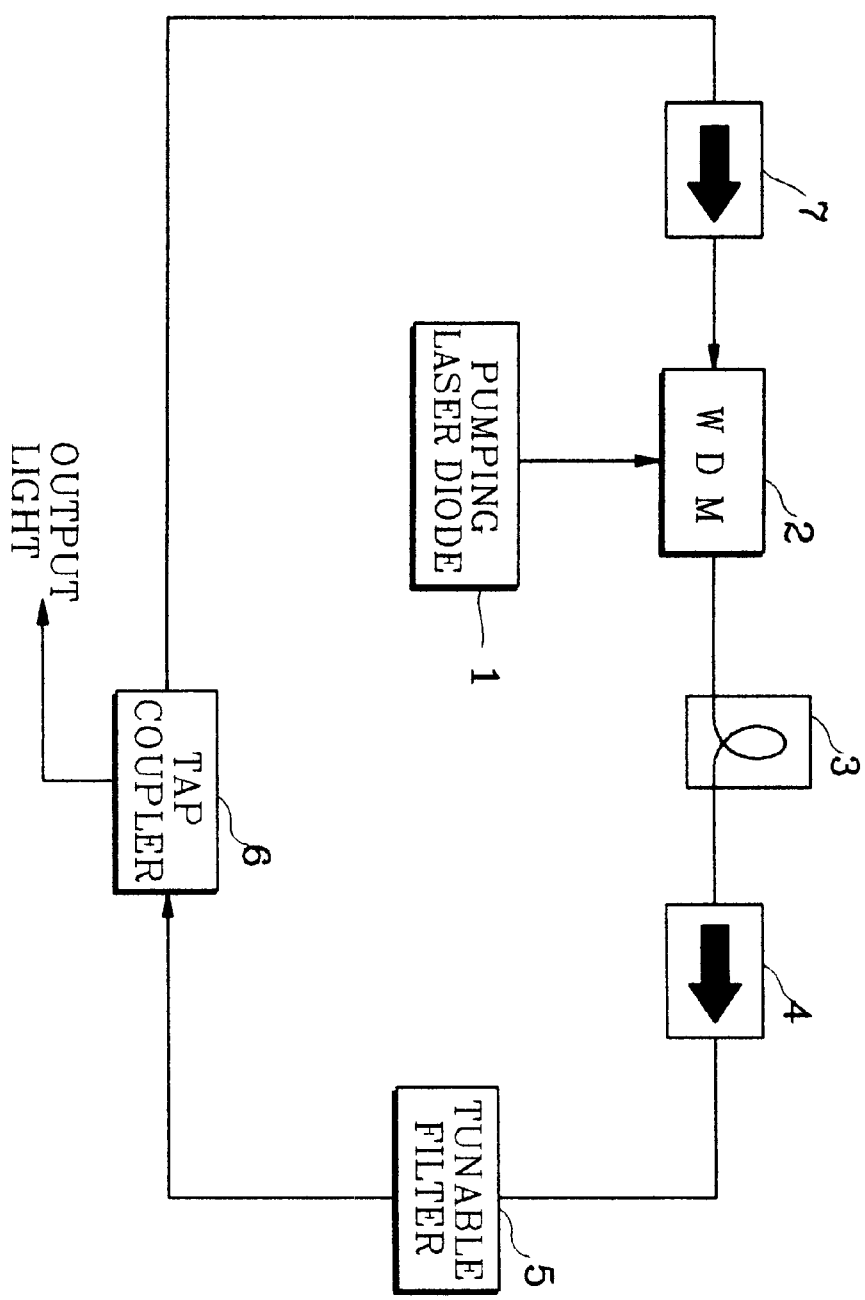
FIG. 2 is a schematic diagram showing a conventional light source generating apparatus having a ring-type structure.
Figure 3:
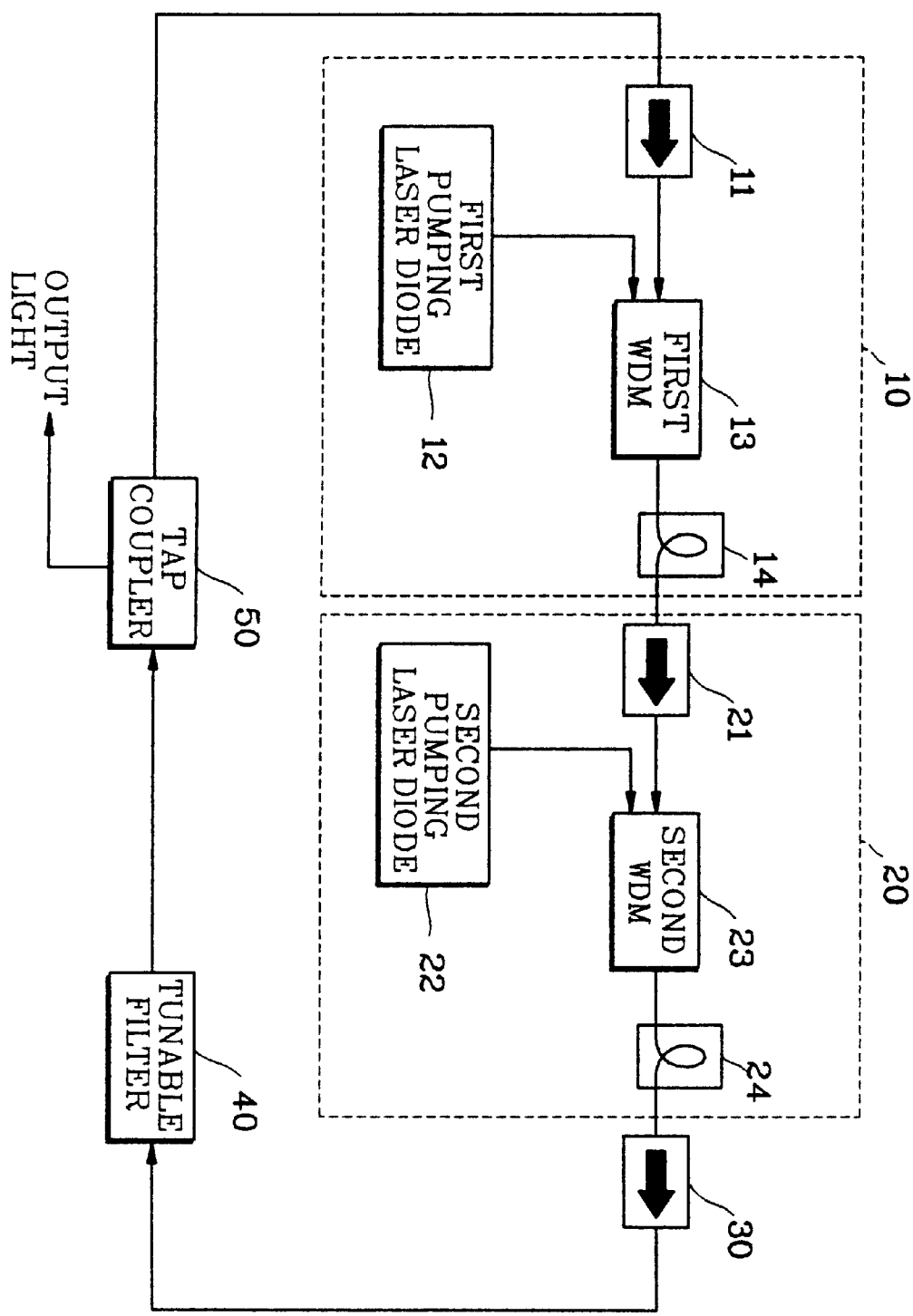
FIG. 3 is a schematic diagram illustrating an apparatus for generating L-band light source using erbium-doped-fibers in accordance with a first embodiment of a first aspect of the present invention.

Now referring to FIG. 3, showing a configuration of an apparatus for generating L-band light source using erbium-doped-fibers in accordance with a first embodiment of a first aspect of the present invention, first and second optical fiber amplifiers 10 and 20 are connected with each other in series. Here, in the first optical fiber amplifier 10, an output light of a first isolator 11 and a pumping light from a first pumping laser diode 12 are input to a first wavelength division multiplexer WDM 13. Then, an output light of the first WDM 13 is input to a first erbium-doped-fiber EDF 14. Here, the pumping light is of 980 nm or 1480 nm. That is, the output light of the first isolator 11 and the pumping light from the first pumping laser diode 12 are input to the first EDF 14 through the first WDM 13, the first EDF 14 amplifies the output light of the isolator 11 based on the pumping light. Here, the first EDF 14 has a length of 21 m, for example, in the same manner with the conventional EDF, which shows a satisfied amplification gain characteristic against a wavelength of 1530 nm to 1560 nm. That is, the first optical fiber amplifier 10 functions as an optical signal amplifier for the C-band.

Meanwhile, the second optical fiber amplifier 20 has the same configuration with the first optical fiber amplifier 10 except that a second EDF 243 has a different length from the first EDF 14. That is, in the second optical fiber amplifier 20, an output light of a second isolator 21 and a pumping light from a second pumping laser diode 22 are input to a second wavelength division multiplexer WDM 23. Then, an output light of the second WDM 23 is input to the second EDF 24. Here, the pumping light is of 980 nm or 1480 nm as well. Especially, the length of the second optical fiber amplifier 24 is set to longer, for amplifying L-band light signal, than that of the first optical fiber amplifier 14. That is, the length of the second EDF 24 is set to 100 m, for example, for providing a maximum amplification gain against the L-band of 1570 nm to 1610 nm. That is, the second optical fiber amplifier 20 functions as an optical signal amplifier for the L-band.

Next, the L-band light output from the second EDF 23 is forwarded to a tunable filer 40 by way of a third isolator 30. The tunable filter 40 passes a specific wavelength of L-band. The output light from the tunable filter 40 is input to a tap coupler 50 which divides the input light in a predetermined ratio, for example 30:70. The tap coupler 50 sends the 30% light to the first optical fiber amplifier 10 as an input, and outputs the 70% light as an output light.

The configuration depicted in FIG. 3 has ring-type structure in a manner that the first optical fiber amplifier 10 for C-band and the second optical fiber amplifier 20 for L-band are coupled to each other in series, and the output light of the second optical fiber amplifier 20 for L-band is returned back to the first optical fiber amplifier 10 for C-band by way of the tunable filter 40.

Figure 4:
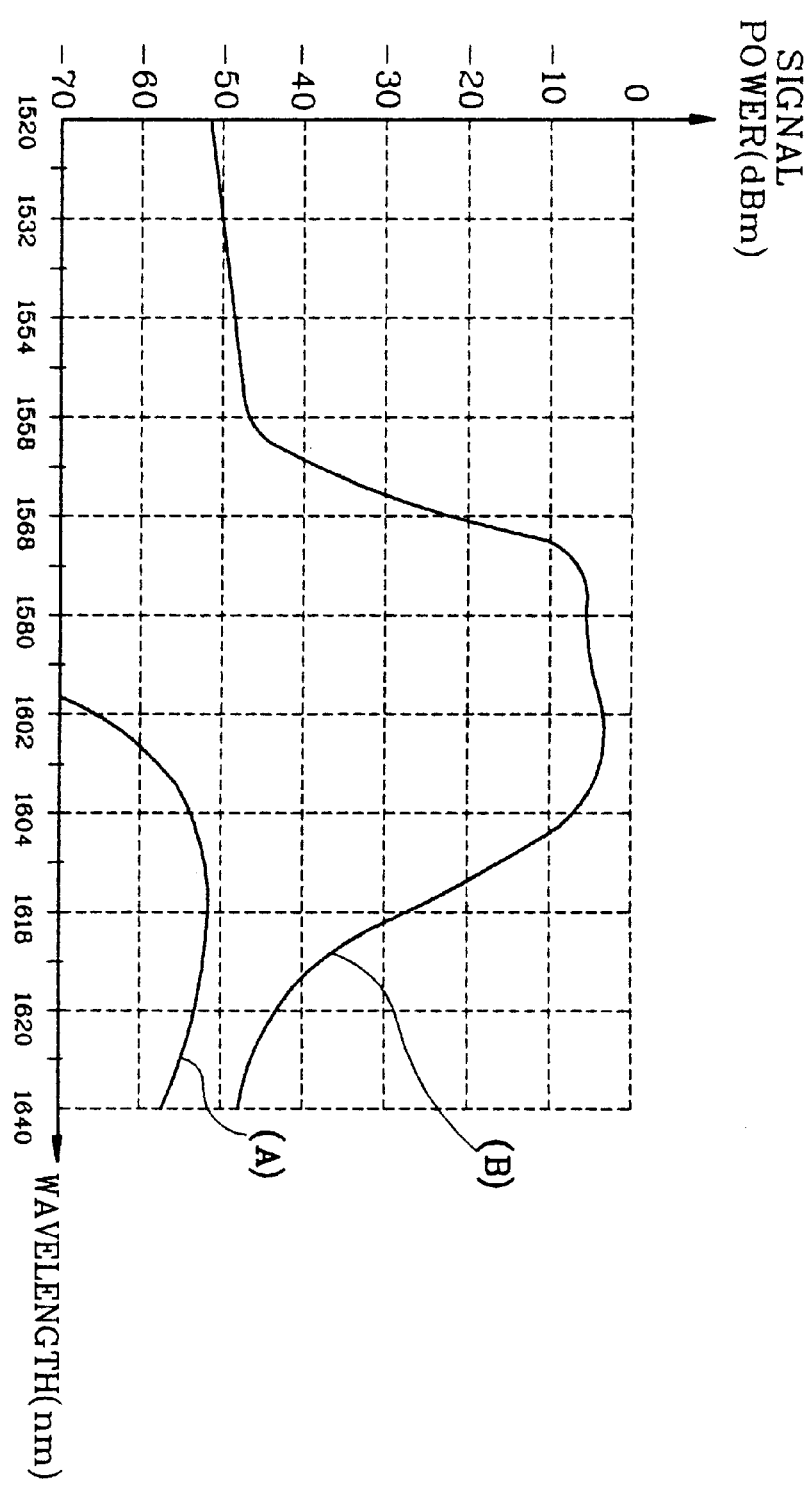
FIG. 4 is a graph showing amplification gain characteristics obtained by first and second optical fiber amplifier in FIG. 3.

Referring to FIG. 4, showing amplification gain characteristics of the second optical fiber amplifier 20 for L-band (A) denotes an amplification gain characteristic when the first optical fiber amplifier 10 is not applied, and (B) shows an amplification gain characteristic when the first optical fiber amplifier 10 is applied, that is, when the output light, amplified spontaneous emission ASE, of the first optical fiber amplifier 10 for C-band is input to the second optical fiber amplifier 20 for L-band. As shown in FIG. 4, if the optical fiber amplifier 10 is not applied, the maximum output power of the second optical fiber amplifier 20 is not exceeded −50 dBm. Whereas, if the ASE output of the first optical fiber amplifier 10 is input to the second optical fiber amplifier 20, the maximum output power of the second optical fiber amplifier 20 is increased sharply exceeding −10 dBm. It is readily considered that the ASE output of the first optical fiber amplifier 10 affects the amplification operation of the second optical fiber amplifier 20. Practically, according to the inventor's study, it is noted that the amplification gain of the second optical fiber amplifier 20 is increased sharply according as the ASE output of the first optical fiber amplifier 10 acts a pumping light in the second optical fiber amplifier 20.

In the above configuration, the high power ASE output from the first optical fiber amplifier 10 is supplied to the second optical fiber amplifier 20 having a maximum amplification gain against L-band as a pumping light. This high power pumping light activates the rare earth ion doped in the second EDF 24 to emit a large quantity of stimulated photon, thus obtaining the good ASE output as shown as (B) in FIG. 4. Then, the high power output light of the second optical fiber amplifier 20 is fed back to the second optical fiber amplifier 20 continuously by way of the tunable filter 40 so as to execute the resonating operation, thus obtaining the good L-band light source from the tap coupler 50. That is, the resonating operation in the common ring-type structure is available when the ASE output of the optical fiber amplifier should be more then −20 dBm. Whereas, since more than −10 dBm output power of the second optical fiber amplifier 20 can be obtained in the above configuration according to the invention, it is possible to execute the resonating operation satisfactorily.

Figure 5:
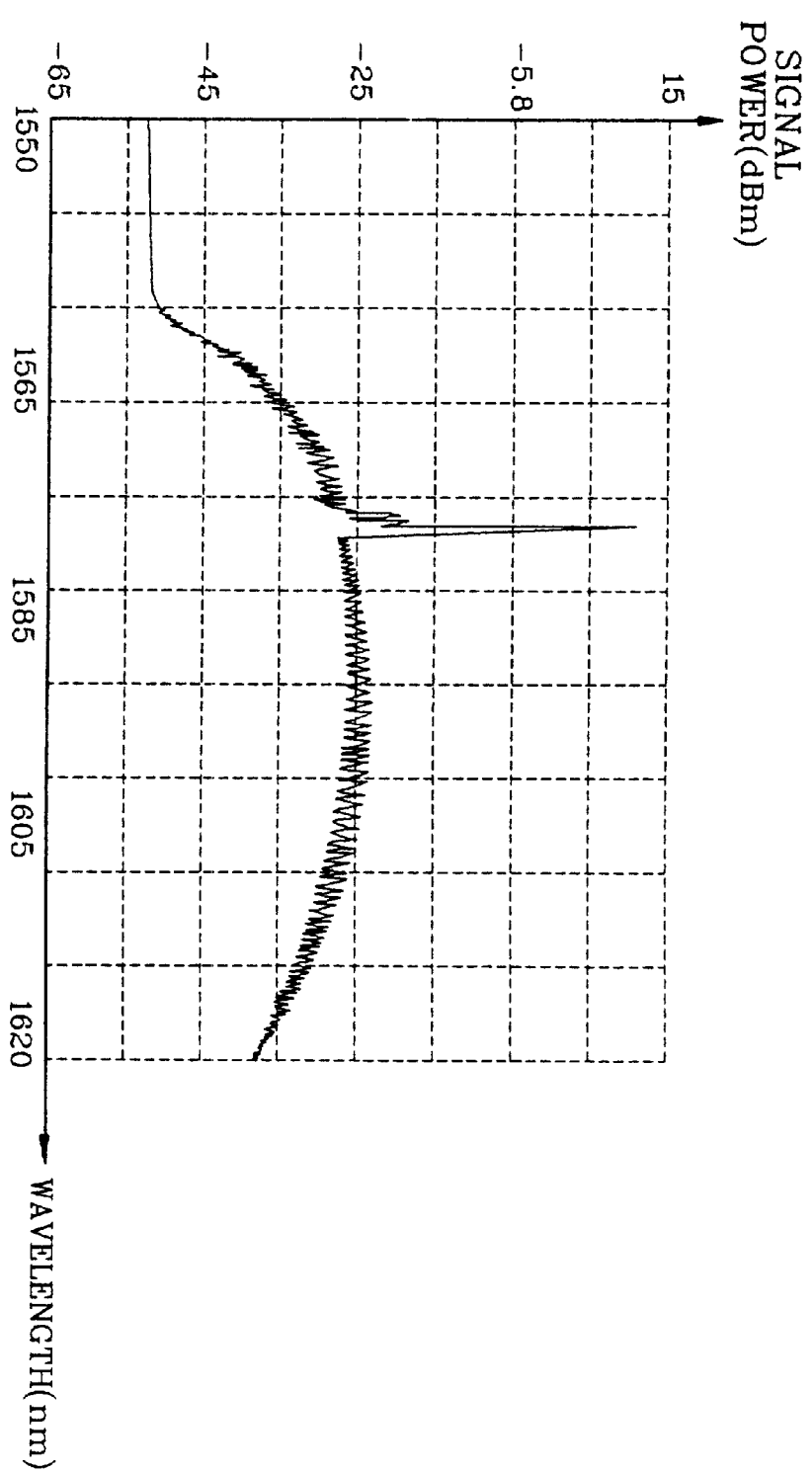
FIG. 5 is a graph showing an example of an output light from a tap coupler in FIG. 4.

FIG. 5 is a graph showing an output light having a wavelength of 1480 nm and a maximum power of 7 dBm, obtained by the tap coupler 40.

Figure 6:
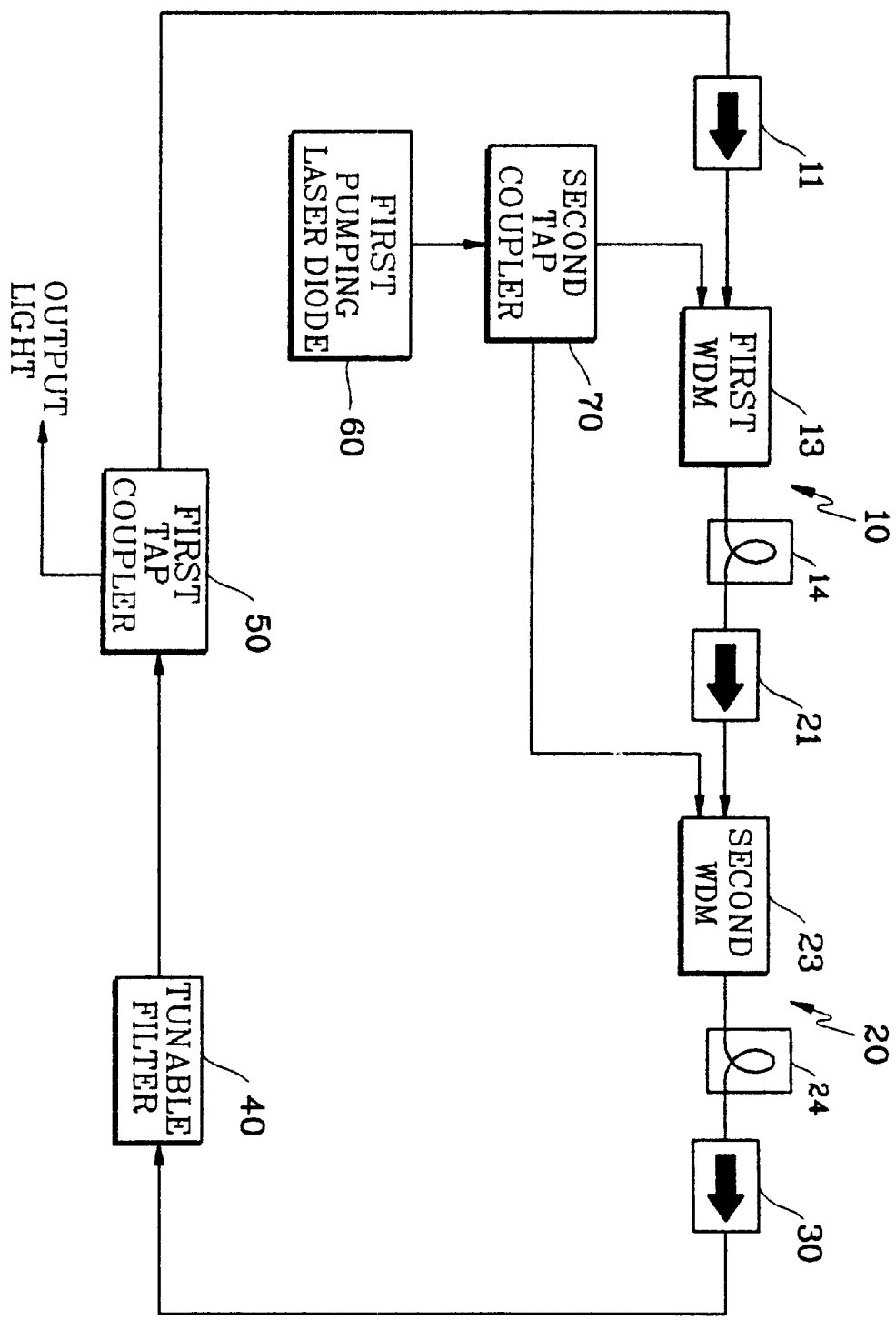
FIG. 6 is a schematic diagram illustrating an apparatus for generating L-band light source using erbium-doped-fibers in accordance with a second embodiment of the first aspect of the present invention.

Now referring to FIG. 6, a schematic diagram illustrating an apparatus for generating L-band light source using erbium-doped-fibers in accordance with a second embodiment of the first aspect of the present invention, the identical elements with FIG. 3 are numbered with the same reference numerals. In the same manner with the embodiment in FIG. 3, the first optical fiber amplifier 10 comprising the first isolator 11, the first WDM 13 and the first EDF 14 is connected in a series with the second optical fiber amplifier 20 comprising the second isolator 21, the second WDM 23 and the second EDF 24. The output light of the second optical fiber amplifier 20 is fed back to the first optical fiber amplifier 10 by way of the tunable filter 40 and a first tap coupler 50. Besides, the first optical fiber amplifier 10 supplies a satisfied amplification gain against C-band and the second optical fiber amplifier 20 provides a maximum amplification gain against L-band. Meanwhile, in the above embodiment of the present invention, a single pumping laser diode 60 is provided, the pumping light output from the pumping laser diode 60 is input to the first and second optical fiber amplifiers 10 and 20, respectively, through a second tap coupler 70. The second tap coupler 70 divides the pumping light of the pumping laser diode 60 in a predetermined ratio, for example 20:80, to send the 20% pumping light to the first optical fiber amplifier 10 and the 80% pumping light to the second optical fiber amplifier 20. Here, even though it is possible to divide the pumping light in other ratio, it is desired to set the amount of pumping light supplied to the second optical fiber amplifier 20 greater than the amount of pumping light applied to the first optical fiber amplifier 10.

As explained in detail above, in case that the ASE output of the first optical fiber amplifier 10 for C-band is input to the second optical fiber amplifier 20 for L-band, the ASE output acts as a pumping light in the second optical fiber amplifier 20 for L-band, thus increasing sharply the amplification gain of the second optical fiber amplifier 20 for L-band. Accordingly, it is possible to obtain a good amplification gain by using only single pumping laser diode 60 without any separate pumping laser diodes for the respective optical fiber amplifiers 10 and 20. That is, according to the above described embodiment of the present invention, an ASE signal having a preferable power against L-band is output from the second optical fiber amplifier 20 by supplying an ASE signal, output from the first optical fiber amplifier 10 having a maximum amplification gain against C-band, with the second optical fiber amplifier 20 having a maximum amplification gain against L-band. Then, the output light of the second optical fiber amplifier 20 is returned back to the first optical fiber amplifier 10 through the tunable filter 40, which are comprised in the ring-type optical amplifier. Consequently, according to the above described embodiment of the present invention, it is possible to obtain a desired L-band light source from the first tap coupler 50 since the L-band light output from the second optical fiber amplifier 20 has a satisfied signal power enough to execute the resonating operation in the ring-type structure. Additionally, it is possible to embody an optical amplifier which amplifies L-band optical signal efficiently using the above configuration.

Figure 7:
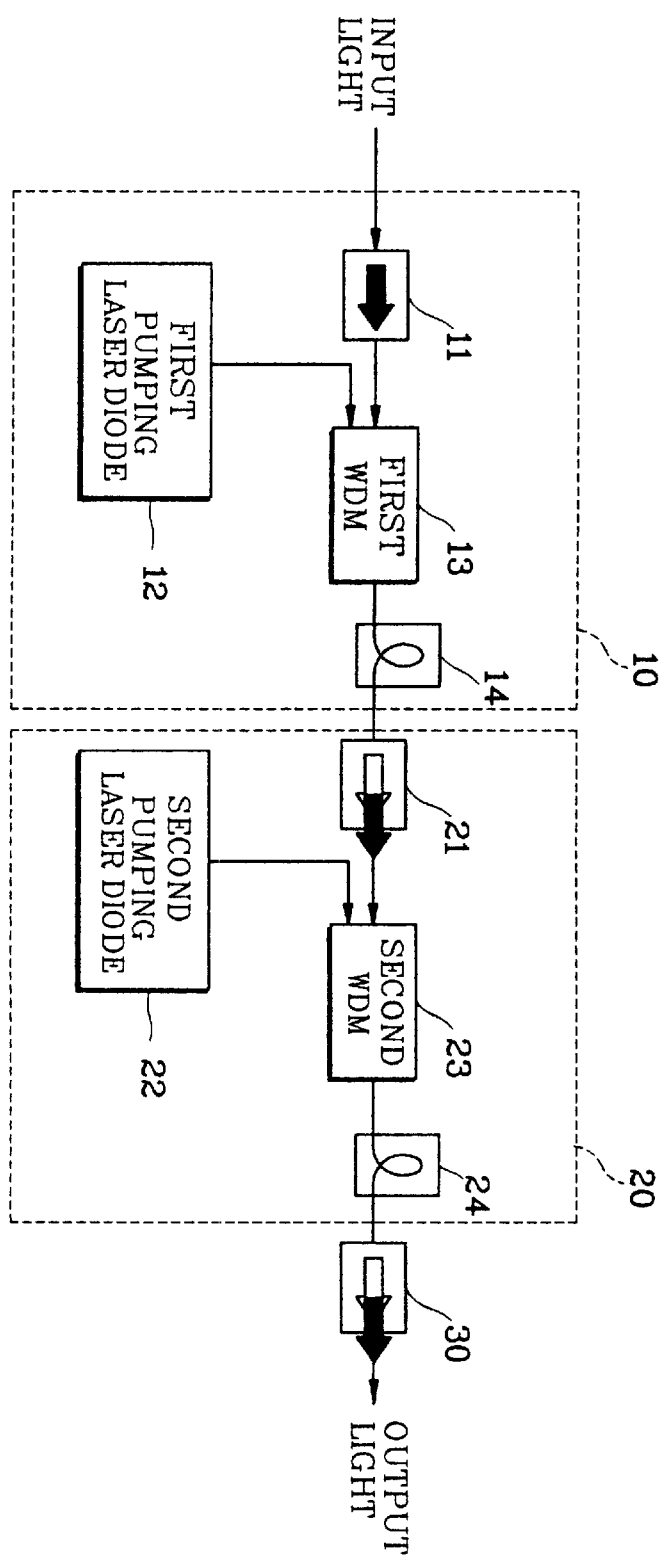
FIG. 7 is a schematic diagram showing an optical amplifier in accordance with a first embodiment of a second aspect of the present invention.

Referring to FIG. 7, a schematic diagram showing an optical amplifier in accordance with a first embodiment of a second aspect of the present invention, the identical elements with FIG. 3 are numbered with the same reference numerals. In FIG. 7, the first and second optical fiber amplifiers 10 and 20 are connected with each other in series. In the same manner with the embodiment in FIG. 3, the first optical fiber amplifier 10 comprises the first isolator 11, the first pumping laser diode 12, the first WDM 13 and the first EDF 14, the second optical fiber amplifier 20 comprises the second isolator 21, the second pumping laser diode 22, the second WDM 23 and the second EDF 24. The output light of the second optical fiber amplifier 20 is output through the third isolator 30. As described in detail above, the first EDF 14 provided in the first optical fiber amplifier 10 is configured to supply a maximum amplification gain against C-band of 1530 nm to 1560 nm by setting the length 21 m, and the second EDF 14 installed in the second optical fiber amplifier 20 is configured to provide a maximum amplification gain against C-band of 1530 nm to 1560 nm by setting the length 100 m.

In the above configuration, since the first optical fiber amplifier 10 provides a satisfied amplification gain against an input light having a wavelength of 1530 nm to 1560 nm, if the L-band signal light is input to the first optical fiber amplifier 10, the input signal light is not amplified, or its signal power is weakened, but input to the second optical fiber amplifier 20. Meanwhile, since the first optical fiber amplifier 10 receives the pumping light from the first pumping laser diode 12, the first optical fiber amplifier 10 outputs the ASE signal to the second optical fiber amplifier 20. Next, the second optical fiber amplifier 20, for providing a maximum amplification gain against an input light having a wavelength of 1570 nm to 1610 nm, outputs the optical signal input from the first optical fiber amplifier 10. Here, since the ASE signal input from the first optical fiber amplifier 10 acts as a pumping light in the second optical fiber amplifier 20, the optical signal is amplified with a great amplification gain. Now to conclude, the optical signal input to the first optical fiber amplifier 10 is amplified with a predetermined amplification gain by means of the first and second optical fiber amplifiers 10 and 20, and output through the third isolator 30.

Figure 8:
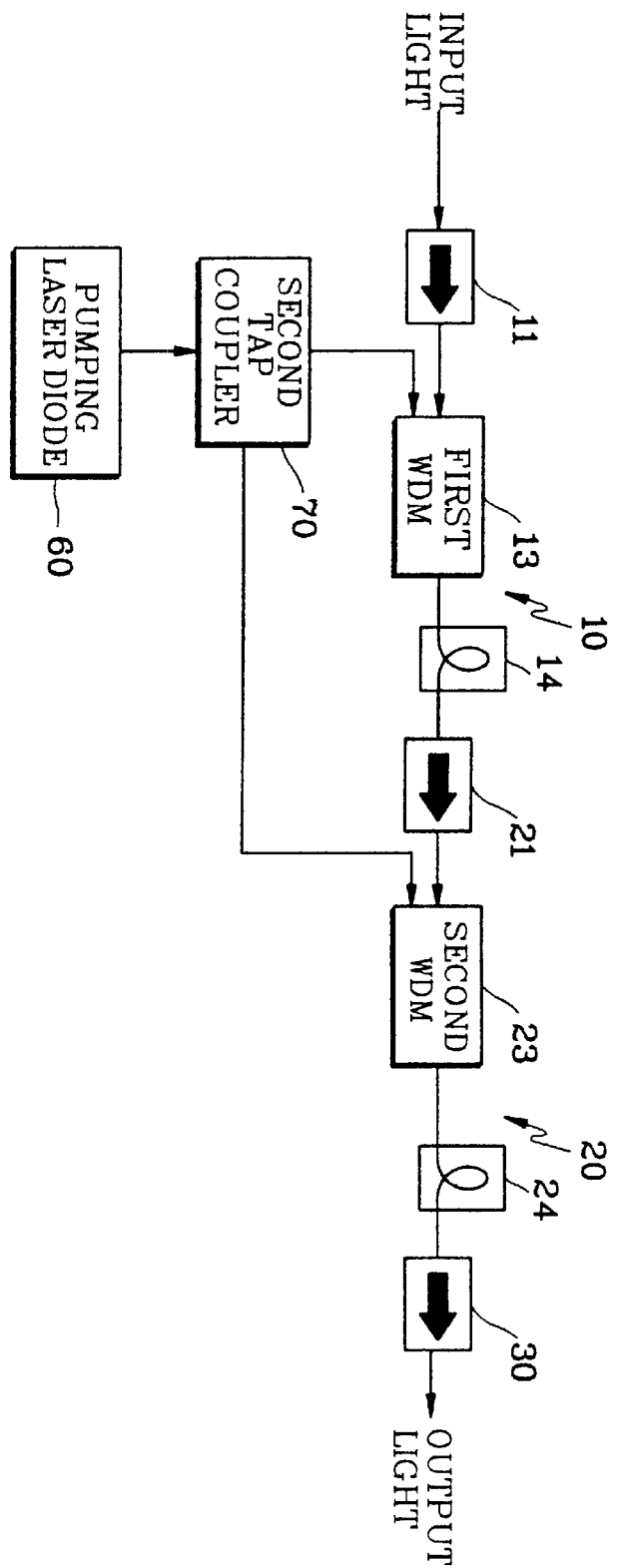
FIG. 8 is a schematic diagram showing an optical amplifier in accordance with a second embodiment of the second aspect of the present invention.

FIG. 8 is a schematic diagram showing an optical amplifier in accordance with a second embodiment of the second aspect of the present invention. Since the embodiment depicted in FIG. 8 corresponds to the configuration shown in FIG. 6 and the substantial operations is identical with FIG. 6 and FIG. 7, detailed description will be omitted.

Figure 9:
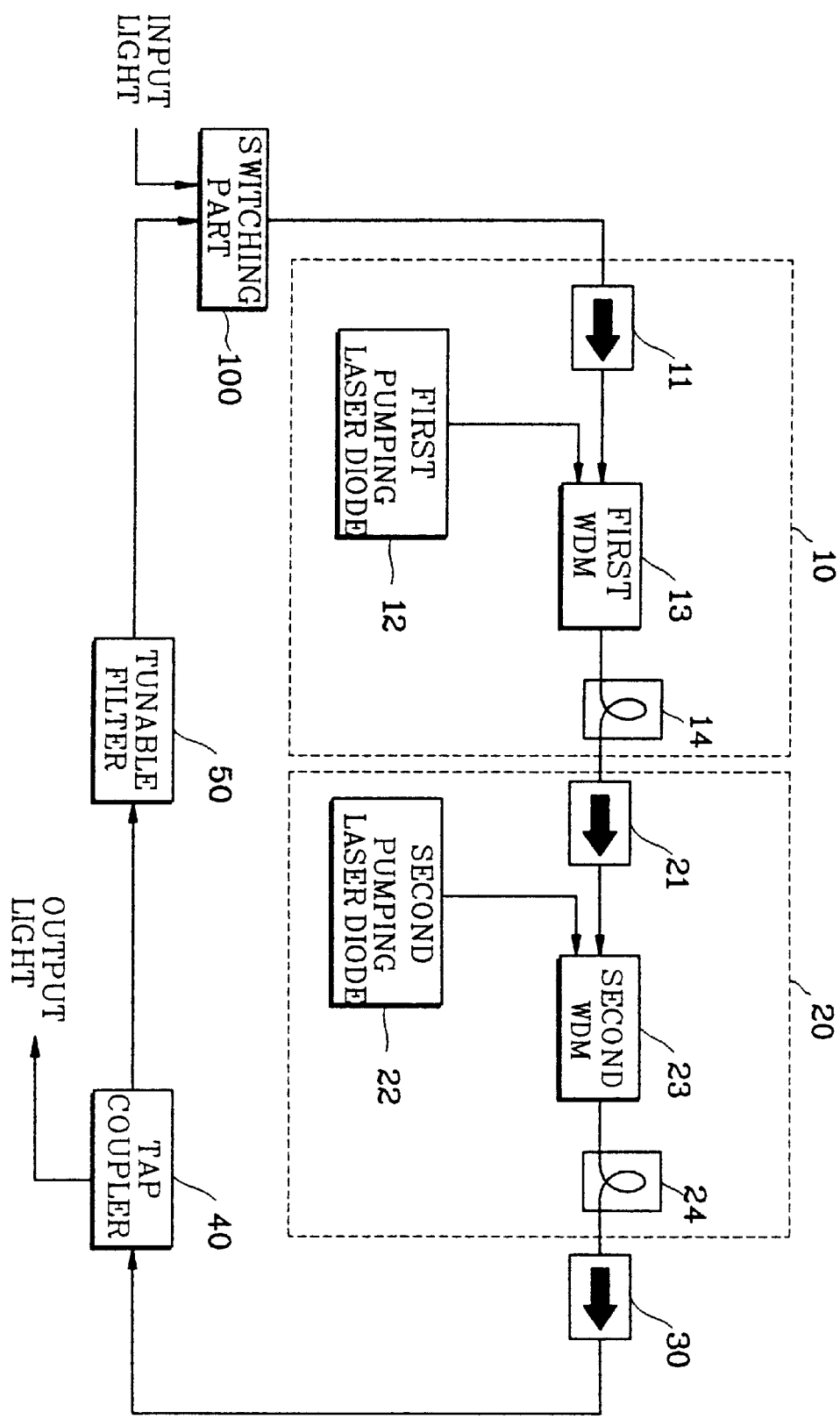
FIG. 9 is a schematic diagram showing an apparatus for generating L-band light source and an optical amplifier having a single structure in accordance with an embodiment of a third aspect of the present invention.

Referring to FIG. 9, a schematic diagram showing an appratus for generating L-band light source and an optical amplifier having a single structure in accordance with an embodiment of a third aspect of the present invention, the identical elements with the former drawings are numbered with the same reference numerals and detailed description will be omitted. In FIG. 9, the apparatus for generating L-band light source and an optial amplifier is constructed in the same manner with the above embodiments. That is, the first optical fiber amplifier 10 for providing a maximum amplification gain against an input light having a wavelength of 1530 nm to 1560 nm and the second optical fiber amplifier 20 for providing a maximum amplification gain against an input light having a wavelength of 1570 nm to 1610 nm are connected in series with each other. The output light of the second optical fiber amplifier 20 is forwarded to the first optical fiber amplifier 10 by way of the third isolator 30, the tap coupler 40 and the tunable filter 50. Besides, a switching part 100 is further established between the tunable filter 50 and the first optical fiber amplifier 10. The switching part 100 is to input the output light of the tunable filter 50 or separate input light to the first optical fiber amplifier 10 alternatively according to the operator's choice. An optical signal having a wavelength of 1570 nm to 1610 nm is used as an input light of the switching part 100.

In the above configuration, when the operator operates the switching part 100 to input the output light of the tunable filter 50 to the first optical fiber amplifier 10, the light having a wavelength selected by the tunable filter 50 is output through the tap coupler 40. That is, the above configuration operates as an apparatus for generating L-band light source, consequently. Whereas, when the operator operates the switching part 100 to input the input light to the first optical fiber amplifier 10, the ring-type structure is dismantled, and the input light is amplified by means of the first and second optical fiber amplifiers 10 and 20, and output through the tap coupler 40. That is, the above configuration operates as an optical amplifier for L-band.

Besides, the present invention isn't confined within the above described embodiments but modified and varied without departing from the spirit or scope of the invention. For example, the embodiment in FIG. 9 configured on the basis of the embodiment in FIG. 3 can be constructed on the basis of FIG. 6. Furthermore, in the embodiments described in FIG. 3 and FIG. 6, the first tap coupler 50 is established in front of the tunable filter 40, however, it is possible to locate the first tap coupler 50 in rear of the tunable filter 40 as shown in FIG. 9.

According to the present invention, it is possible to use the output light of the first optial fiber amplifier as a pumping light of the second optical fiber amplifier by connecting the first optical fiber amplifier for supplying a maximum amplification gain against an input light having a wavelength of 1530 nm to 1560 nm with the second optical fiber amplifier for supplying a maximum amplification gain against an input light having a wavelength of 1570 nm to 1610 nm in series, thus securing a satisfied amplification gain against a L-band light and to generate a desirable light source.

What is claimed is:

1. An apparatus for generating L-band light source using optical fiber comprising:

a first optical fiber amplifier for supplying a maximum amplification gain against an input light having a wavelength of 1530 nm to 1560 nm;

a second optical fiber amplifier, connected with the first optical fiber amplifier, for providing a maximum amplification gain against an input light having a wavelength of 1570 nm to 1610 nm; and a tunable filter for passing an input light having a specific wavelength from the output light of the second optical fiber amplifier, the output light of the tunable filter is input to the first optical fiber amplifier, a tap coupler is established on an optical line through which the output light of the second optical fiber amplifier is forwarded to the first optical fiber amplifier.

2. The apparatus for generating L-band light source using optical fiber as claimed in claim 1, wherein the first and second optical fiber amplifiers receive a pumping light from a single pumping light.

3. The apparatus for generating L-band light source using optical fiber as claimed in claim 2, wherein an amount of pumping light supplied to the second optical fiber amplifier is greater than an amount of pumping light supplied to the first optical fiber amplifier.

4. An optical amplifier comprising:

a first optical fiber amplifier, connected with an optical line in series, for supplying a maximum amplification gain against an input light having a wavelength of 1530 nm to 1560 nm; and a second optical fiber amplifier, connected with an output of the first optical fiber amplifier in series, for providing a maximum amplification gain against an input light having a wavelength of 1570 nm to 1610 nm.

5. The optical amplifier as claimed in claim 4, wherein the first and second optical fiber amplifiers receive a pumping light from a single pumping light.

6. The optical amplifier as claimed in claim 5, wherein an amount of pumping light supplied to the second optical fiber amplifier is greater than an amount of pumping light supplied to the first optical fiber amplifier.

7. An apparatus for generating L-band light source and an optical amplifier comprising:

a first optical fiber amplifier for supplying a maximum amplification gain against an input light having a wavelength of 1530 nm to 1560 nm;

a second optical fiber amplifier, connected with the first optical fiber amplifier, for providing a maximum amplification gain against an optical signal having a wavelength of 1570 nm to 1610 nm;

a tunable filter for passing an input light having a specific wavelength from the light output from the second optical amplifier;

a switching means for inputting the output light of the tunable filter or a specific input light selectively to the first optical fiber amplifier; and a tap coupler for receiving the output light of the second optical fiber amplifier and outputting a predetermined amount of light as an output light.

8. The apparatus for generating L-band light source and an optical amplifier as claimed in claim 7, wherein the first and second optical fiber amplifiers receive a pumping light from a single pumping light.

* * * * *